United States Patent [19]

Shirodkar

[11] Patent Number: 5,242,922
[45] Date of Patent: Sep. 7, 1993

[54] BLENDS OF HDPE AND POLYBUTENE

[75] Inventor: Pradeep P. Shirodkar, Somerset, N.J.

[73] Assignee: Mobil Oil Corporation, Fairfax, Va.

[21] Appl. No.: 903,306

[22] Filed: Jun. 24, 1992

[51] Int. Cl.$^5$ .................. C08L 23/04; C08L 23/20
[52] U.S. Cl. ................................. 524/528; 525/240
[58] Field of Search ..................... 524/528; 525/240

[56] References Cited

U.S. PATENT DOCUMENTS

| | | | |
|---|---|---|---|
| 3,660,530 | 5/1972 | Hoblit et al. | 524/528 |
| 3,703,565 | 11/1972 | Hoblit et al. | 524/528 |
| 4,359,544 | 11/1982 | Hwo et al. | 524/528 |
| 4,886,849 | 12/1989 | Hwo et al. | 525/240 |
| 4,929,681 | 5/1990 | Bahl et al. | 525/240 |
| 4,957,972 | 9/1990 | Shirodkar | 525/240 |
| 5,073,420 | 12/1991 | Yano et al. | 525/193 |

Primary Examiner—Paul R. Michl
Assistant Examiner—Olga Asinovsky
Attorney, Agent, or Firm—Alexander J. McKillop; Malcolm D. Keen; Marina V. Schneller

[57] ABSTRACT

Novel blends of high density polyethylene compounded with a minor amount of an at least partially isotactic, partially crystalline butene-1 polymer comprising at least about 80 wt % of polymerized butene-1. The blends can be fabricated into containers with lower swell compared to those of the unblended HDPE.

5 Claims, No Drawings

BLENDS OF HDPE AND POLYBUTENE

FIELD OF THE INVENTION

High density polyethylene (HDPE) resins characterized by undesirable high swell are modified for blow molding processes. The present invention can improve the swell behavior of these resins. Accordingly, the invention relates to novel blends comprising HDPE for blow molding operations. Furthermore, the invention relates to improving blow molding operation processes.

BACKGROUND OF THE INVENTION

Expansion of United States and worldwide HDPE capacity is continuing unabated. Its major application is found in blow molding.

Blow molding is the most common process for making hollow parts, e.g., bottles. It is often done on a large scale with a single production line making only one product.

In blow molding processes, a molten tube of resin is extruded into a parison, an end of which is sealed die so that air can enter from one area (or end); The parison is inflated to assume the shape of the mold; and then the shaped object is cooled and ejected. Air under pressure is fed through the die into the tube which expands to fill the mold, and the part is cooled as it is held under internal air pressure. As the parison is extruded, the melt is free to swell and sag. Optimum conditions in blow molding processes require that the resin be characterized by very consistent swell and sag melt properties. A viscous melt is needed to prevent sag. Swell reduction has been achieved by controlled degradation of HDPE resins. However, controlled degradation produces thermally unstable resins which have low ESCR properties. If a very large container is to be made, the machine may be equipped with a cylinder and a piston as an accumulator for the melt. The accumulator is filled with melt from the extruder and then is emptied at a much faster rate to form a large parison; thus, sag of the molten tube is minimized Cf. KIRK OTHMER, "Plastics Processing" Vol. 18, pp. 198-199 (Third Edition.)

Resins used in plastic bottles, e.g. for HIC (household and industrial container) applications, also must exhibit environmental stress cracking resistance.

Environmental stress cracking resistance (ESCR) is measured by a standard Bell Bent Strip ESCR test method ASTM D1693. Stressed cracking resistance ($F_{50}$) is the time taken for 50% of the specimens to fail (h). Herein below, testing was undertaken on 70 mils ASTM plaques with slit in 100% Igepal at 50° C.

SUMMARY OF THE INVENTION

HDPE produced with chromium catalysts often exhibit high swell. Catalyst modification may provide one way of reducing swell (Cf. U.S. Pat. No. 5,096,868). In accordance with the invention, blends are provided which improve (lower) the swell characteristics of those HDPE produced with chromium catalysts.

DETAILED DESCRIPTION OF THE INVENTION

The HDPE used in the invention exhibits a density of greater than 0.938 and preferably of at least 0.94. Densities can be controlled by amount of comonomer, e.g. 1-butene, 1-hexene and 1-octene in the olefin (ethylene) feed to the reactor. Accordingly, the HDPE may be a homopolymer and/or a copolymer of ethylene. The HDPE used in the invention exhibits a melt index ranging from 0.05 to 1.0. Melt indices vary according to reactor temperature, catalyst and amount of hydrogen used to modify molecular weight, during polymerization. Molecular weight distribution is controlled by the catalyst. Preferably, the HDPE used in the invention exhibits broad molecular weight distribution which is reflected by the ratio of high load melt index ($I_{21}$) to melt index ($I_2$), specifically the ratio $I_{21}/I_2$. $I_2$ is measured by ASTM D-1238, Condition E measured at 190° C., reported as grams per 10 minutes; and $I_{21}$ is measured by ASTM D-1238, Condition F, measured at 10.5 times the weight used in the $I_2$ test. Preferably that ratio exceeds 28.

The HDPE polymers discussed in this patent are formed with a chromium catalyst in the fluid bed gas phase reactor. However, the concept of blending polybutene could also be applied to resins with high swell produced by other processes.

Environmental stress cracking resistance (ESCR) of the HDPE is measured by the standard Bell Bent Strip ESCR test method, ASTM D1693. Stressed cracking resistance ($F_{50}$) is the time taken for 50% of the specimens to fail hours (h). Herein below, testing was undertaken at 50° C. in 100 Igepal on 70 mils ASTM plaques with slit.

Annular swell as measured herein is determined as the weight of tube per inch divided by the cross-sectional area of the tube (inches$^2$), and is accordingly, reported herein as a number which is weight in grams per inch. For this measurement, the resin is extruded through an annular die to form a tube, cooled and cut. The optimum die swell for a resin used in HIC applications ranges from 0.7 to 0.8, at resin density of about 0.95 to about 0.954, for articles smaller than milk containers. The significance of the annular die swell is that it relates to the weight of the ultimate article produced by blow molding. A more detailed description of the annular die swell test is outlined in a publication by P. P. Tong et al in Proceedings of SPE 48th Annual Technical Conference (1990) in Dallas, page 1612. This article also relates annular die swell with bottle weight. As can be seen below, the blend of the invention can reduce the annular die swell of the blend compared to the HDPE alone while maintaining ESCR. Preferably the die swell for HIC applications remains within the range of 0.7 to 0.8. When the HDPE has a higher die swell than 0.8, the inclusion of the poly(1-butene) will act to reduce the annular die swell.

In accordance with the invention a binary blend containing HDPE, and isotactic polybutene is provided which exhibits excellent processability, during blow molding with substantial retention of desirable properties of the HDPE. In accordance with the invention the binary blend containing HDPE and isotactic polybutene, can contain commercial quantities of color and necessary stabilizing (antioxidants) and exhibits excellent processability with substantial retention of inherent properties of the HDPE.

The blend contains 99.5 to 90 weight, preferably 99 to 95% and most preferably 99 to 96% of high density polyethylene (percentage based on blend of the HDPE and poly(1-butene.) The blends of the invention contain 0.5 to 10 weight %, preferably 1 to 5 weight % and most preferably 1 to 4 weight % of polybutene (percentage based on the blend.)

The butene-1 polymers contemplated under this invention are at least partially isotactic, partially crystalline polymers comprising at least 80 wt. %, preferably at least 90 wt. % of polymerized butene-1. These polymers include homopolymers of butene-1 and copolymers of at least about 80 wt. % of butene-1 and up to about 20 wt. % of at least one polymerized comonomer, e.g., an olefin, preferably a 1-olefin, containing 2 to about 10 carbon atoms, and preferably have a number average molecular weight of at least about 25,000, a density of from about 0.890 to 0.920, and a melt index of from about 0.1 to 40, (ASTM condition E). Some of these polymers are described in the article on "Polymers of Higher Olefins" in Kirk Othmer, *Encyclopedia of Chemical Technology*, Third Edition, Wiley Interscience, 1981, pages 470–477. The polymers may be prepared using a Ziegler Natta type catalyst as described for example in U.S. Pat. No. 3,362,940 or the foregoing Kirk Othmer article. In general, the butene-1 polymers in unblended form are capable of being formed into shaped articles such as films.

In addition to the polymer components, the blend may also contain any of various additives conventionally added to polymer compositions for different purposes, e.g. lubricants such as microtalc, stabilizers, antioxidants, compatibilizers, pigments, etc.

EXAMPLES

EXAMPLE 1

The blends were prepared by melt mixing in the Brabender twin screw compounder granular HDPE prepared by a Chromium Catalyst described in U.S. Pat. No. 5,096,868 (which is incorporated by reference herein) in a fluid bed reactor and commercially available poly 1-butene (Shell's PB0400) with adequate stabilizers at 200° C. The resultant pellets were characterized for their swell behavior using the annular die swell test. The ESCR properties were determined from molded plaques using the Bell bent strip test in 100% Igepal as discussed earlier.

| Resin | Annular Swell gms/inch | ESCR, $T_{50}$ hrs. |
|---|---|---|
| (1) HDPE A (Control) | .736 | 18 |
| (2) A + 1% PB0400 | .718 | 24 |
| (3) A + 2% PB0400 | .710 | 40 |
| (4) A + 5% PB0400 | .645 | 40 |

This HDPE had a High load melt index of 35 and $I_{21}/I_2$ of 77 and a density of 0.955 gms/cc.

EXAMPLE 2

The blends were prepared similarly to Example 1. A different HDPE feedstock (made from Sillyl Chromate type catalyst in a fluid bed reactor) was used.

| Resin | Annular Swell gms/inch | ESCR, $T_{50}$ hrs. |
|---|---|---|
| (1) HDPE B (Control) | .921 | 48 |
| (2) B + 1% PB 0400 | .905 | 49 |
| (3) B + 2% PB 0400 | .850 | 44 |
| (4) B + 5% pB 0400 | .795 | 31 |

This HDPE had a high load melt index of 19, and $I_{21}/I_2$ of 104, and a density of 0.960 gms/cc.

Thus it is apparent that there has been provided, in accordance with the invention, a blend, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A blend for blow molding applications requiring an annular die swell in weight (grams)/inch of 0.7 to 0.8 comprising 99.5 to 90 weight percent of a high density polyethylene homopolymer or copolymer, wherein the high density polyethylene homopolymer or copolymer exhibits a density of greater than 0.938; and from 0.5 to 10 weight percent of isotactic poly(1-butene) comprising at least 80 weight percent of polymerized butene-1.

2. The blend of claim 1, wherein the amount of isotactic poly(1-butene) ranges from 1.0 to 5 weight percent.

3. The blend of claim 2 wherein the density of the PE is greater than 0.94.

4. The blend of claim 1 wherein the polyethylene homopolymer or copolymer has an melt index of 0.05 to 1.0.

5. A blow molding process for forming household and industrial containers comprising melt blending a polyethylene homopolyer or copolymer of a density greater than 0.94 when compounded with a minor amount of an at least partially isotactic, partially crystalline butene-1 polymer comprising at least about 80 wt % of polymerized butene-1, so that the blend has an annular die swell in gram/inch ranging from 0.7 to 0.8; extruding a melt of said blend through an annnlar die of a blowing molding apparatus to form a parison and shaping the parison in a mold.

* * * * *